Figure 17:
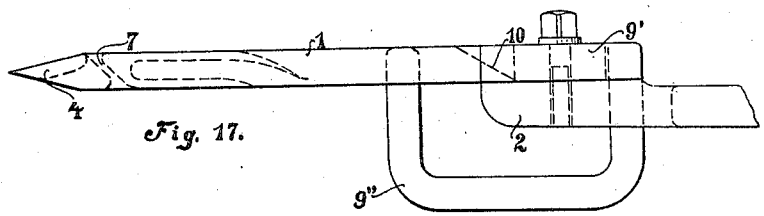

Jan. 9, 1923.
M. BRETSCHNEIDER.
MEANS FOR PRODUCING BEADED EMBROIDERY ON EMBROIDERING MACHINES.
FILED APR. 21, 1922.
1,441,557.
3 SHEETS—SHEET 1.
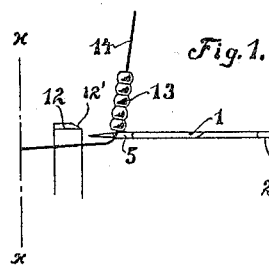
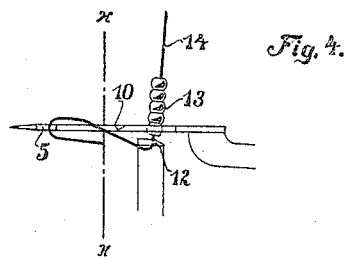
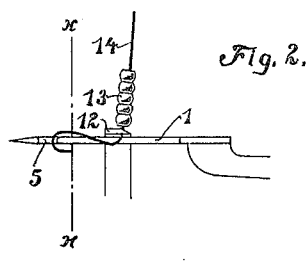
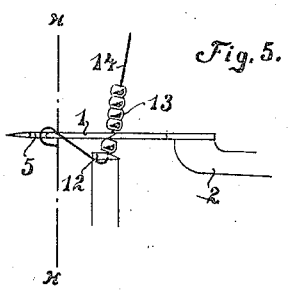
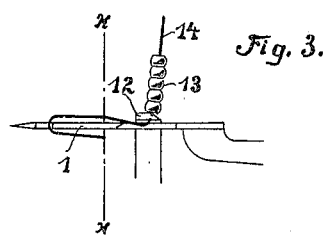
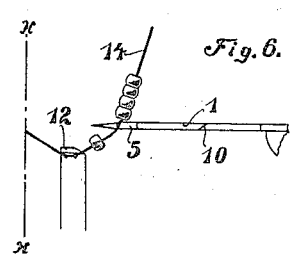
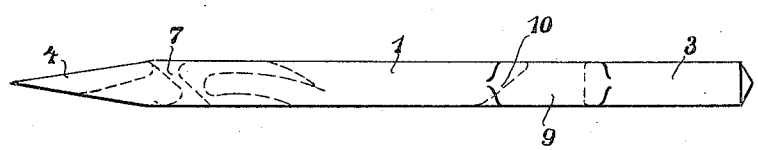
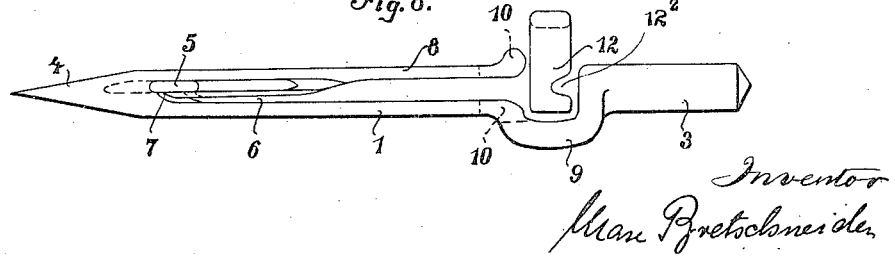
Inventor
Max Bretschneider Jan. 9, 1923.
M. BRETSCHNEIDER.
MEANS FOR PRODUCING BEADED EMBROIDERY ON EMBROIDERING MACHINES.
FILED APR. 21, 1922.
1,441,557.
3 SHEETS—SHEET 2.
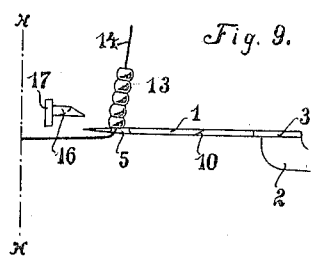
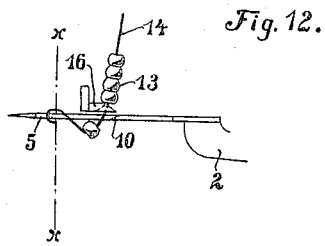
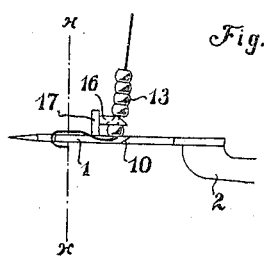
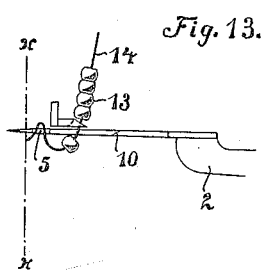
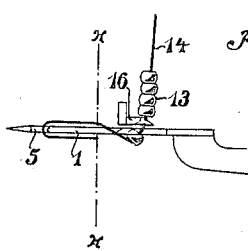
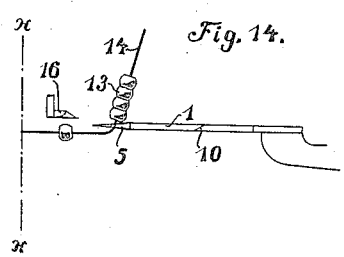
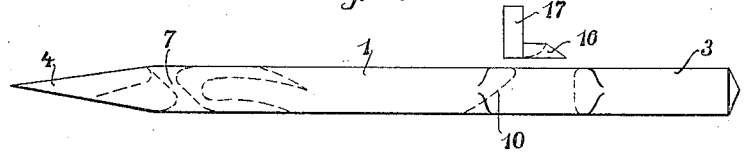
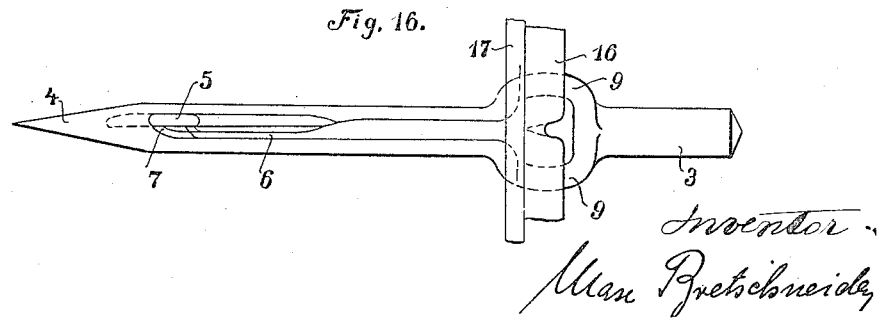

Jan. 9, 1923. 1,441,557.
M. BRETSCHNEIDER.
MEANS FOR PRODUCING BEADED EMBROIDERY ON EMBROIDERING MACHINES.
FILED APR. 21, 1922. 3 SHEETS—SHEET 3.

Inventor
Max Bretschneider

Patented Jan. 9, 1923.

1,441,557

UNITED STATES PATENT OFFICE.

MAX BRETSCHNEIDER, OF PLAUEN, GERMANY.

MEANS FOR PRODUCING BEADED EMBROIDERY ON EMBROIDERING MACHINES.

Application filed April 21, 1922. Serial No. 555,872.

*To all whom it may concern:*

Be it known that I, MAX BRETSCHNEIDER, a citizen of the German Republic, and a resident of Plauen, Saxony, Germany, have invented a certain new and useful Means for Producing Beaded Embroidery on Embroidering Machines, of which the following is a specification.

According to a known method, a thread set with beads is worked with aid of a long-slotted needle in such a manner that it is drawn by a lifting member into the long needle slot, and the loop thus formed is unthreaded at the front, viz at the needle eye which communicates with said slot, and immediately after this procedure the rear end of the loop is threaded into the needle eye.

This fundamental procedure is kept up also in the present invention which, however, extends beyond the known effect in so far as a considerably quicker and more dependable manner of working is rendered possible. Wrong stitches where there is no bead upon the thread between two stitching places of the needle are obviated by the novel means forming part of the invention. Distribution and movement of the beads is effected in a nearly positive way. Also thread breaks do not occur because unnecessary creases in the embroidery thread are obviated.

The invention consists in the following features: The needle co-operates, for the purpose of distributing the beads, with a lifting member; the pile of beads is supported alternately by the needle and the lifting member and is carried by this latter, after the needle has completely pierced the fabric, into the range of a distributing device provided at the needle, this device separating from the pile those beads which are to be applied to the fabric at the next stitch of the needle.

In order to make my invention more clear, I refer to the accompanying drawing, in which similar numbers of reference denote similar parts throughout the several views, and in which Figs. 1–6 show the various stages of the embroidering procedure; Fig. 7 is a side view of an embroidery needle drawn on a larger scale. Fig. 8 is a plan view of this needle. Figs. 9–14 are illustrations similar to Figs. 1–6 and show a modification of the method and Figs. 15 to 21 are illustrations similar to Figs. 7 and 8 of modified forms of construction.

The embroidery needles 1 are fastened in known manner, by means of their rear ends 3, upon the needle bar 2. Between said rear end of the needle and the needle point 4 which is provided with the eye 5 is an elongated slot 6 provided in the stem of the needle. The slot 6 terminates into the eye 5 with an oblique slot 7 which extends toward the point 4 so that a thread introduced into the elongated slot 6 moves into the eye 5 when the needle is withdrawn, whereas, in the reverse direction, the thread can not pass from the eye into the slot. The direction of the small inclined connecting slot is such that the rear end of the latter which is directed towards the rear end of the needle lies at that side of the needle where the shuttle passes, so that the thread cannot pass back into the elongated slot during the embroidering operation proper.

The various forms of construction of the needle are distinguished from each other solely by the manner in which the halves of the stem formed by the elongated slot are supported with respect to the needle bar. In the form of construction illustrated in Figs. 7 and 8, only one half of the needle stem is connected with the rear end of the needle by an offset portion 9, whereas the other half 8 of the stem which is thin, comparatively like a spring, terminates freely without any support of its own. At the offset portion 9 the halves of the stem are each provided with an oblique surface or separator 10, the object of which will be described later on.

In the form of construction illustrated in Figs. 15 and 16 each stem half is connected with the rear end of the needle by an offset portion 9, each of said portions having an oblique surface 10.

Figure 18:
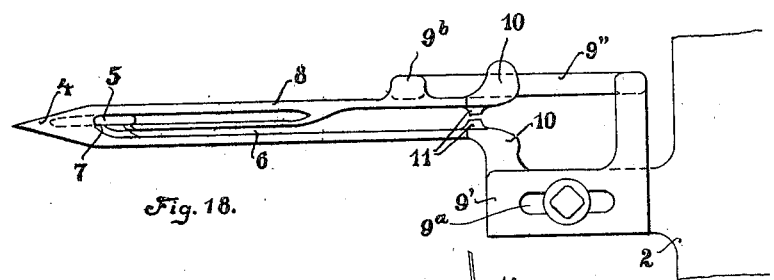

Also in the third form of construction of the needle, Figs. 17 and 18, each needle half is connected with the needle bar by an offset portion 9' and 9". One of these, say 9', is flat and provided with a slot 9ª (Fig. 18) which serves for attaching the needle to the bar 2. The offset portion 9' lies in a horizontal plane and the offset portion 9" lies in a vertical plane. The front end of said portion 9" is joined to the stem half 8 not at the end of the latter but somewhat in front of it, as at 9ᵇ.

Figure 19:
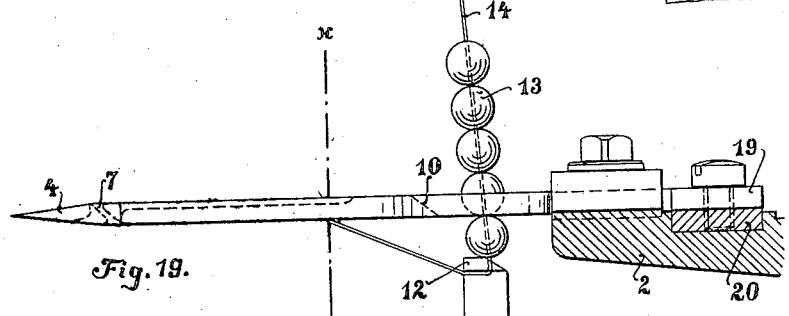
Figure 21:
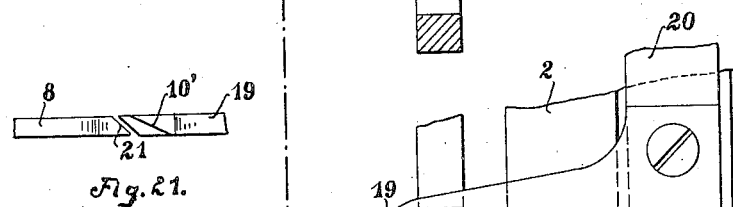
Figure 20:
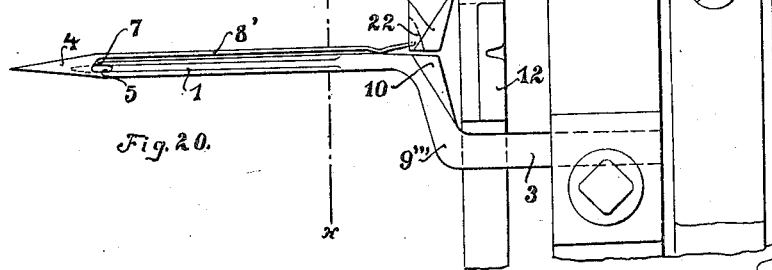

In Figs. 19 and 20 only one of the needle stem halves is rigidly connected with the rear end 3 of the needle by an offset portion 9''' and this portion is provided with an oblique surface 10. The other half 8' of the needle stem is but very thin so that the diameter of the needle can be made comparatively small. The oblique surface 10' is not provided on this resilient needle portion, but on a special finger 19 which is affixed to an auxiliary rail 20 that in its turn may be displaced upon the needle bar transversely of the longitudinal direction of the needles. Owing to this arrangement the finger 19 is capable of a movement additional to that of the separators 10 of the before described forms of construction of the embroidery needles.

Now, the mode of operation is as follows:—

Referring first to Figs. 1–6 in general and to Fig. 1 in particular, a plurality of beads 13 strung upon the thread 14 has arrived at the needle 1 and is there held in readiness as a store-pile for being worked. The embroidery thread passes from the needle eye 5 to the fabric x—x to be embroidered. Before the needle penetrates the fabric, the beads lie directly upon it, as shown in Fig. 1. But when the needle is advanced, it passes below the lifting member 12 in so close proximity to it (Fig. 2) that said member lifts the pile of beads off the needle by means of its tapered edge 12', after which the beads are no longer supported by the needle, but by said member. At the same time the thread 14 enters a narrow and carefully rounded-off notch 12² of the lifting member (Fig. 3).

When the needle has completely penetrated the fabric (Fig. 4) the lifting member 12 is lowered together with the store-pile of beads 13, which is rendered possible by the offset portion 9 between the needle shaft and the rear needle end to such an extent that the oblique surface of the needle, on the return movement of this latter, cuts between the lowermost bead and the adjacent one and separates the former from the other beads (Fig. 5). It is obvious that the lifting member might be lowered by suitable means to such a depth that the returning needle separates not merely one bead, but two or three or even more, as may be required in the case. The number of the beads to be separated from the store-pile depends upon the pattern to be embroidered.

During the downward motion of the lifting member 12, i. e. before the separation of the bead or beads, that portion of the thread 14 which is situated between the needle eye 5 and the lifting member 12 has entered into the elongated slot 6 of the needle. Whilst the needle moves back, said thread portion is gradually gathered through the slots 6 and 7 into the eye 5. At the same time the thread portion running from the lifting member 12 to the bead pile 13 is shifted along the slot 6 of the needle 1 in the direction toward the eye 5 and is, finally, threaded into it, so that the separated bead becomes located between the needle eye and the surface of the fabric (Fig. 6). As soon as the needle has reached its rearmost position the lifting member 12 is again lifted into the position shown in Fig. 1 and the various phases of the procedure are repeated, one bead after the other being separated from the pile and sewn to the fabric.

Between the function of the needle construction shown in Figs. 7 and 8, and that of the modification illustrated in Figs. 9–14, there is merely that difference that the lifting member 16 when in its initial position (Fig. 9) stands so high above the needle that on the advance motion of the needle, as shown in Fig. 10, it cuts between the lowermost bead and the adjacent one. Thus, for the purpose of separating the lowermost bead, the member 16 need not cross the path of the needle when this latter has completely penetrated the fabric, but need be lowered only so much that the oblique separating surfaces 10 of the needle pass between the lowermost bead and the member 16 when the needle is withdrawn. The member 16 is formed with a ledge 17 whose object it is to act as a stop for the separated beads until the needle 1 has completely penetrated the fabric and the beads are brought into the range of the oblique surfaces 10 of the needle.

The embroidery method permits rigidly connecting the rear ends of the needle halves with the rear needle end, as illustrated in Fig. 16, whereas with the method according to Figs. 1–6, only one of said halves is connected with the rear needle end, the other remaining unsupported. It might, therefore, happen that this needle half will become bent or distorted in consequence of the stress to which it is exposed during the separation of the beads, and the needle would, thus, be spoiled. This drawback may, however, be obviated by supporting both needle halves or legs at the rear needle end, but arranging at least one of the two offset portions in a vertical position as shown in the form of construction in Figs. 17 and 18, where 9'' is the vertically disposed offset portion which joins the associate needle half somewhat in front of the separating surface 10. This arrangement renders it possible for the lifting member to pass down into the offset portion 9'' in conformity with the position illustrated in Fig. 4. But as soon as the lowermost bead has been separated by means of the needle, as shown in Fig. 5, the member 12 must perform a laterally directed additional motion in order to move out of the range of the offset portion 9'' so as not to impede the rearward motion of the needle. The lifting member (not shown) used in this case is the same as is used in the first modification, except that it lacks a notch. Owing to the member 12 giving way laterally, the thread loop situated below the embroidery needle is freed so that it is held solely by the separated bead, and not also by the member 12, as in Fig. 6. Near the separating surface 10 there are provided, at the inner side of the two needle legs, two small projections 11 which prevent the needle slot from being closed by the compression of legs when the fabric to be embroidered is being pierced.

Another modification to reliably support the two separator surfaces 10 is shown in Figs. 19 and 20, in which one of them, 10', is provided on a specially constructed finger 19 secured to a rail 20. This rail is longitudinally displaceable upon the needle bar 20 so that the finger 19 may be laterally moved with respect to the needle in order to clear the member 12 when the needle advances and to embrace the beaded thread 14 in order to separate the lowermost bead from the other ones during the return motion of the needle. During this separating phase the oblique separating surfaces 10 and 10' must be in so close proximity to one another that the thread is just capable of passing through between them. To insure that the embroidery thread will properly pass during the return motion of the needle, from the range of the separating surfaces 10, 10', into the elongated slot, the resilient leg or tongue 8' of the needle is pointed at 21 and bent slightly away from the other needle leg so that it is overlapped by the finger 19, as at 22, and permits the thread to securely enter into the elongated slot during the bead separating phase.

The various forms of construction of the embroidery device may be employed also for the manufacture of vari-colored embroideries. This may be attained either by stringing upon the threads beads of such different colors as are required for the pattern to be made, or a plurality of beaded threads may be made use of, each with beads of a certain color, these threads being then brought into the range of the needle in such a succession as the design requires.

Having now described my invention, what I claim as new and desire to secure by Letters Patent of the United States is:

1. In an embroidery machine, the combination of an embroidery needle having an elongated slot extending nearly to its point and at least one bead-pile separating surface between said slot and the main portion of its stem, a member adapted to be vertically reciprocated in such relation to said separating surface that on the advance of the needle it will lift a pile of beads strung upon an embroidery thread off the advancing needle and on the return stroke of said needle it will lower said pile so as to cause one or more of the beads to become located below the needle and be separated by said separating surface, substantially as described.

2. In an embroidery machine, the combination of an embroidery needle having an elongated slot subdividing the needle into two legs, and having an oblique bead-pile separating surface at least at one of said legs, a member adapted to be vertically reciprocated in such relation to said separating surface that on the advance of the needle it will lift a pile of beads strung upon an embroidery thread off the advancing needle, and on the return stroke of the needle it will lower said pile so as to cause one or more of the beads to become located below the needle and be separated by said separating surface, substantially as described.

3. In an embroidery machine, the combination of an embroidery needle having an elongated slot subdividing the needle into two legs and having an oblique bead-pile separating surface at least at one of said legs, and having, further, an offset portion also at least in one of the legs between said oblique surface and the fastening end of the needle, a member adapted to be vertically reciprocated in such relation to said separating surface that on the advance of the needle it will lift a pile of beads strung upon an embroidery thread off the advancing needle, and on the return stroke of said needle it will lower said pile so as to cause one or more of the beads to pass through the space formed by the said offset portion below the needle and be separated by said separating surface, substantially as described.

4. In an embroidery machine, the combination of an embroidery needle having an elongated slot subdividing the needle into two legs, and having an oblique bead-pile separating surface at least at one of said legs and having, further, an offset portion also at least in one of the legs, between said oblique surface and the fastening end of the needle and lying in a horizontal plane, a member adapted to be vertically reciprocated in such relation to said separating surface that on the advance of the needle it will lift a pile of beads strung upon an embroidery thread off the advancing needle and on the return stroke of said needle it will lower said pile so as to cause one or more of the beads to pass through the space formed by said offset portion below the needle and be separated by said separating surface, substantially as described.

5. In an embroidery machine, the combination of an embroidery needle having an elongated slot subdividing the needle into two legs, of which one is connected with the fastening end of the needle and the other leg has a free end and of which at least one has an oblique bead-pile separating surface located between said slot and the fastening end of the needle; and a member adapted to be vertically reciprocated in such relation to said separating surface that on the advance of the needle it will lift a pile of beads strung upon an embroidery thread off the advancing needle, and on the return stroke of said needle it will lower said pile so as to cause one or more of the beads to become located below the needle and be separated by said separating surface, substantially as described.

6. In an embroidery machine, the combination of an embroidery needle having an elongated slot subdividing the needle into two legs, and having an oblique bead-pile separating surface at one of said legs; a needle bar attached to the frame of the embroidery machine; an auxiliary rail located upon said bar and adapted to be displaced upon it; a finger-like member secured to said rail and extending in the direction to the bead-pile separating surface of the needle and having also such a surface located oppositely to the first-mentioned one; a member adapted to be vertically reciprocated in such relation to said separating surface that on the advance of the needle it will lift a pile of beads strung upon an embroidery thread off the advancing needle, and on the return stroke of said needle it will lower said pile so as to cause one or more of the beads to become located below the needle and be separated by said separating surface, substantially as described.

7. In an embroidery machine, the combination of an embroidery needle having an elongated slot subdividing the needle into two legs, and having an oblique bead-pile separating surface at least at one of said legs, and having, further, an offset portion also at least in one of the legs, between said oblique surface and the fastening end of the needle; a needle bar attached to the frame of the embroidery machine; an auxiliary rail located upon said bar and adapted to be displaced upon it; a finger-like member secured to said rail and being located in the plane of said offset portion and having at its end also a bead-pile separating surface located oppositely to the first-mentioned one; a member adapted to be vertically reciprocated in such relation to said separating surface that on the advance of the needle it will lift a pile of beads strung upon an embroidery thread off the advancing needle and on the return stroke of said needle it will lower said pile so as to cause one or more of the beads to become located below the needle and be separated by said separating surface, substantially as described.

In testimony whereof I affix my signature in presence of two witnesses.

MAX BRETSCHNEIDER.

Witnesses:
 REED. E. FRICKA,
 HERBERT DOBEREUP.